Van Orden

3,720,458
March 13, 1973

[54] SYMMETRICAL LENS
[75] Inventor: Lynn L. Van Orden, Holley, N.Y.
[73] Assignee: Bausch & Lomb Incorporated, Rochester, N.Y.
[22] Filed: Feb. 7, 1972
[21] Appl. No.: 224,046

[52] U.S. Cl. .................................. 350/227, 350/202
[51] Int. Cl. ..................... G02b 9/26, G02b 17/08
[58] Field of Search .......................... 350/227, 202

[56] References Cited
UNITED STATES PATENTS
716,035   12/1902   Harting .............................. 350/227
3,044,357   7/1962   Linke ................................. 350/202
3,301,130   1/1967   Buchroeder et al. ................ 350/227

Primary Examiner—John K. Corbin
Attorney—Frank C. Parker et al.

[57] ABSTRACT

A family of symmetrical lenses having three components of which the outside two are doublets consisting of an outer biconvex and an inner biconcave lens while the interior lens is biconcave, has been designed primarily for photographic use at substantially unity magnification.

54 Claims, No Drawings

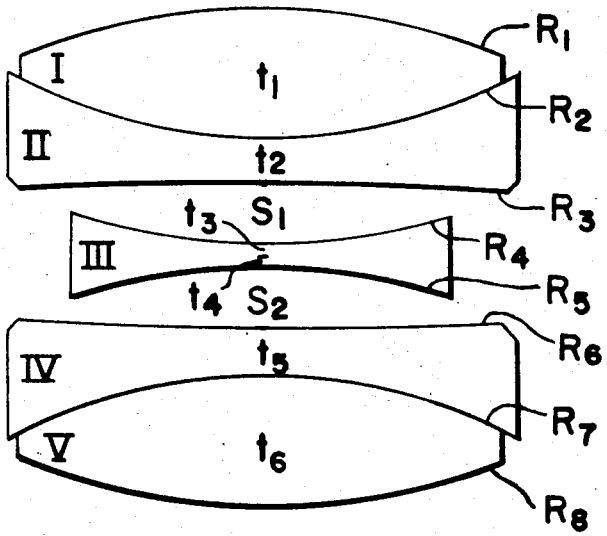

SYMMETRICAL LENS

BACKGROUND OF THE INVENTION

1. Field of the Invention

The field of this invention is lens designs and more specifically those three component designs following a symmetrical positive-negative-positive pattern and having a multiple element exterior component.

2. Description of the Prior Art

U.S. Pat. Nos. 716,035 to C. Harting and 3,301,130 to R. Buchroeder et al. disclose the general shape pattern of the lenses of this invention, however the instant lenses are thought to be operable under conventional conditions at wider relative apertures than those cited.

SUMMARY OF THE INVENTION

The lenses of the family disclosed have three components of which the outer two are identical doublets, each having a biconcave lens facing inward and a biconvex lens facing outward. The inner lens is biconcave and is centered between the others. Several specific designs are disclosed herein and all will perform free of distortion, lateral color and coma when used at unit magnification, as is more fully described and set forth in Chapter XIX, *Applied Optics & Optical Design*, A.E. Conrady, Dover, 1960. The other aberrations are sufficiently well corrected for use in unit magnification copying, which is the primary intent of these lenses, although various other uses might be made of them as is well known to those skilled in the optical arts.

The symmetrical lenses disclosed herein may take either a complete form, or may be cut at the center for insertion of a plano mirror so that the lens becomes a retroreflective lens and so that a ray, entering through the front portion, is reflected by the mirror back through the front portion with the same optical effect as though the ray continued on through a complete lens. Obvious economies of material, space and assembly are available from such a configuration.

DETAILED DESCRIPTION OF THE INVENTION

Figure 1:
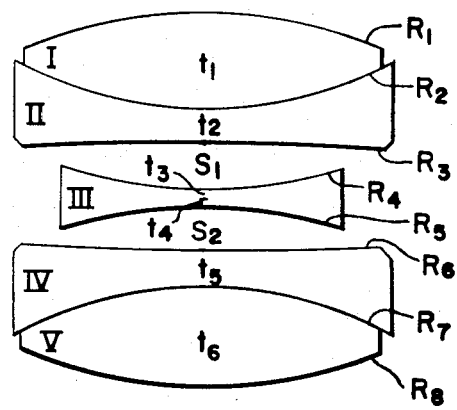
FIG. 1 is an optical diagram illustrating the relative shapes of the lenses arranged in operative position along an optical axis.
Figure 2:
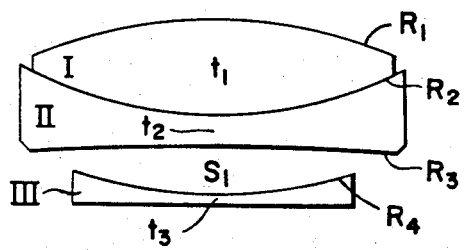
FIG. 2 is an optical diagram similar to FIG. 1 but cut at the center for use with a plano mirror.

Since these lenses are symmetrical, those skilled in the art will appreciate that a complete description is obtained from only the first four radii R, the thicknesses $t$ of the elements of the outer doublet and the half-thickness of the inner lens, the space S between the outer and inner lenses and the respective glass descriptions, the refractive indices $n_D$ and the dispersion ratios $\nu$.

Thus, the 26 lenses disclosed in the tables below by only those mentioned values are to be understood as being either retroreflective half lenses or as the whole lens, at the option of the reader.

As is conventional in describing lens designs, the drawings show schematic cross-sections of the lenses arrayed in operative positions along an optical axis with the radii, thicknesses and spaces subnumerated in increasing order from one end toward the other. The centers of the radii are taken as positive if on one side and negative if on the other. All radii, thicknesses and spaces are expressed as ratios of the overall focal length so as to facilitate the practice of the invention at any desired focal length. The glass characteristics, the refractive indices $n_D$ and the dispersions $\nu$, are subnumerated increasingly in the same direction as the other values. It is thought that slight variations in the listed values may be accepted in order to accommodate certain vagaries of manufacture. In particular, the thicknesses $t_1$ and $t_2$ are thought to be tolerant of at least one unit's variation in the third decimal place and $t_3$ to be tolerant of at least a half unit's variation in the third decimal place.

TABLE 1. (Lens design 1.)

| | |
|---|---|
| $R_1$ | .382$f$ |
| $-R_2$ | .450$f$ |
| $R_3$ | 2.025$f$ |
| $-R_4$ | .381$f$ |
| $t_1$ | .054$f$ |
| $t_2$ | .050$f$ |
| $t_3$ | .009$f$ |
| $S_1$ | .038$f$ |
| $n_{D1}$ | 1.678 |
| $n_{D2}$ | 1.532 |
| $n_{D3}$ | 1.578 |
| $\nu_1$ | 55.3 |
| $\nu_2$ | 45.9 |
| $\nu_3$ | 41.5 |

TABLE 2. (Lens design 2.)

| | |
|---|---|
| $R_1$ | .384$f$ |
| $-R_2$ | .424$f$ |
| $R_3$ | 2.323$f$ |
| $-R_4$ | .372$f$ |
| $t_1$ | .054$f$ |
| $t_2$ | .050$f$ |
| $t_3$ | .009$f$ |
| $S_1$ | .054$f$ |
| $n_{D1}$ | 1.697 |
| $n_{D2}$ | 1.561 |
| $n_{D3}$ | 1.603 |
| $\nu_1$ | 55.6 |
| $\nu_2$ | 45.2 |
| $\nu_3$ | 42.3 |

TABLE 3. (Lens design 3.)

| | |
|---|---|
| $R_1$ | .386$f$ |
| $-R_2$ | .434$f$ |
| $R_3$ | 2.400$f$ |
| $-R_4$ | .382$f$ |
| $t_1$ | .054$f$ |
| $t_2$ | .050$f$ |
| $t_3$ | .009$f$ |
| $S_1$ | .044$f$ |
| $n_{D1}$ | 1.678 |
| $n_{D2}$ | 1.548 |
| $n_{D3}$ | 1.578 |
| $\nu_1$ | 55.3 |
| $\nu_2$ | 45.7 |
| $\nu_3$ | 41.5 |

TABLE 4. (Lens design 4.)

| | |
|---|---|
| $R_1$ | .373$f$ |
| $-R_2$ | .434$f$ |
| $R_3$ | 1.782$f$ |
| $-R_4$ | .386$f$ |
| $t_1$ | .054$f$ |
| $t_2$ | .050$f$ |
| $t_3$ | .009$f$ |
| $S_1$ | .028$f$ |
| $n_{D1}$ | 1.691 |
| $n_{D2}$ | 1.548 |
| $n_{D3}$ | 1.603 |
| $\nu_1$ | 54.8 |
| $\nu_2$ | 45.7 |

$\nu_3$ 42.3

TABLE 5. (Lens design 5.)

| | |
|---|---|
| $R_1$ | .383f |
| $-R_2$ | .453f |
| $R_3$ | 2.229f |
| $-R_4$ | .379f |
| $t_1$ | .054f |
| $t_2$ | .050f |
| $t_3$ | .009f |
| $S_1$ | .046f |
| $n_{D1}$ | 1.678 |
| $n_{D2}$ | 1.532 |
| $n_{D3}$ | 1.589 |
| $\nu_1$ | 55.3 |
| $\nu_2$ | 45.9 |
| $\nu_3$ | 40.9 |

TABLE 6. (Lens design 6.)

| | |
|---|---|
| $R_1$ | .373f |
| $-R_2$ | .436f |
| $R_3$ | 1.964f |
| $-R_4$ | .384f |
| $t_1$ | .054f |
| $t_2$ | .050f |
| $t_3$ | .009f |
| $S_1$ | .031f |
| $n_{D1}$ | 1.678 |
| $n_{D2}$ | 1.532 |
| $n_{D3}$ | 1.603 |
| $\nu_1$ | 55.3 |
| $\nu_2$ | 45.9 |
| $\nu_3$ | 42.3 |

TABLE 7. (Lens design 7.)

| | |
|---|---|
| $R_1$ | .392f |
| $-R_2$ | .460f |
| $R_3$ | 1.964f |
| $-R_4$ | .379f |
| $t_1$ | .054f |
| $t_2$ | .050f |
| $t_3$ | .009f |
| $S_1$ | .048f |
| $n_{D1}$ | 1.697 |
| $n_{D2}$ | 1.548 |
| $n_{D3}$ | 1.578 |
| $\nu_1$ | 55.6 |
| $\nu_2$ | 45.7 |
| $\nu_3$ | 41.5 |

TABLE 8. (Lens design 8.)

| | |
|---|---|
| $R_1$ | .383f |
| $-R_2$ | .441f |
| $R_3$ | 1.845f |
| $-R_4$ | .381f |
| $t_1$ | .054f |
| $t_2$ | .050f |
| $t_3$ | .009f |
| $S_1$ | .035f |
| $n_{D1}$ | 1.691 |
| $n_{D2}$ | 1.548 |
| $n_{D3}$ | 1.578 |
| $\nu_1$ | 54.8 |
| $\nu_2$ | 45.7 |
| $\nu_3$ | 41.5 |

TABLE 9. (Lens design 9.)

| | |
|---|---|
| $R_1$ | .381f |
| $-R_2$ | .449f |
| $R_3$ | 2.389f |
| $-R_4$ | .399f |
| $t_1$ | .054f |
| $t_2$ | .050f |
| $t_3$ | .009f |
| $S_1$ | .033f |
| $n_{D1}$ | 1.678 |
| $n_{D2}$ | 1.548 |
| $n_{D3}$ | 1.603 |
| $\nu_1$ | 55.3 |
| $\nu_2$ | 45.7 |
| $\nu_3$ | 42.3 |

TABLE 10. (Lens design 10.)

| | |
|---|---|
| $R_1$ | .388f |
| $-R_2$ | .477f |
| $R_3$ | 1.684f |
| $-R_4$ | .380f |
| $t_1$ | .054f |
| $t_2$ | .050f |
| $t_3$ | .009f |
| $S_1$ | .040f |
| $n_{D1}$ | 1.697 |
| $n_{D2}$ | 1.532 |
| $n_{D3}$ | 1.578 |
| $\nu_1$ | 55.6 |
| $\nu_2$ | 45.9 |
| $\nu_3$ | 41.5 |

TABLE 11. (Lens design 11.)

| | |
|---|---|
| $R_1$ | .383f |
| $-R_2$ | .408f |
| $R_3$ | 3.135f |
| $-R_4$ | .381f |
| $t_1$ | .054f |
| $t_2$ | .050f |
| $t_3$ | .009f |
| $S_1$ | .051f |
| $n_{D1}$ | 1.678 |
| $n_{D2}$ | 1.561 |
| $n_{D3}$ | 1.603 |
| $\nu_1$ | 55.3 |
| $\nu_2$ | 45.2 |
| $\nu_3$ | 42.3 |

TABLE 120 (Lens design 12.)

| | |
|---|---|
| $R_1$ | .393f |
| $-R_2$ | .461f |
| $R_3$ | 2.162f |
| $-R_4$ | .378f |
| $t_1$ | .054f |
| $t_2$ | .050f |
| $t_3$ | .009f |
| $S_1$ | .055f |
| $n_{D1}$ | 1.697 |
| $n_{D2}$ | 1.548 |
| $n_{D3}$ | 1.589 |
| $\nu_1$ | 55.6 |
| $\nu_2$ | 45.7 |
| $\nu_3$ | 40.9 |

TABLE 13. (Lens design 13.)

| | |
|---|---|
| $R_1$ | .387f |
| $-R_2$ | .433f |
| $R_3$ | 2.772f |
| $-R_4$ | .377f |
| $t_1$ | .054f |
| $t_2$ | .050f |
| $t_3$ | .009f |
| $S_1$ | .055f |
| $n_{D1}$ | 1.678 |
| $n_{D2}$ | 1.548 |
| $n_{D3}$ | 1.589 |
| $\nu_1$ | 55.3 |
| $\nu_2$ | 45.7 |
| $\nu_3$ | 40.9 |

TABLE 14. (Lens design 14.)

| | |
|---|---|
| $R_1$ | .378f |
| $-R_2$ | .471f |
| $R_3$ | 1.641f |
| $-R_4$ | .385f |
| $t_1$ | .054f |
| $t_2$ | .050f |
| $t_3$ | .009f |
| $S_1$ | .031f |
| $n_{D1}$ | 1.697 |
| $n_{D2}$ | 1.532 |
| $n_{D3}$ | 1.603 |
| $\nu_1$ | 55.6 |
| $\nu_2$ | 45.9 |
| $\nu_3$ | 42.3 |

TABLE 15. (Lens design 15.)

| | |
|---|---|
| $R_1$ | .391f |
| $-R_2$ | .417f |
| $R_3$ | 3.131f |
| $-R_4$ | 3.76f |
| $t_1$ | .054f |
| $t_2$ | .050f |
| $t_3$ | .009f |
| $S_1$ | .059f |
| $n_{D1}$ | 1.678 |
| $n_{D2}$ | 1.561 |
| $n_{D3}$ | 1.578 |
| $\nu_1$ | 55.3 |
| $\nu_2$ | 45.2 |
| $\nu_3$ | 4.15 |

TABLE 16. (Lens design 16.)

| | |
|---|---|
| $R_1$ | .390f |
| $-R_2$ | .477f |
| $R_3$ | 1.859f |
| $-R_4$ | .379f |
| $t_1$ | .054f |
| $t_2$ | .050f |
| $t_3$ | .009f |
| $S_1$ | .048f |
| $n_{D1}$ | 1.697 |
| $n_{D2}$ | 1.532 |
| $n_{D3}$ | 1.589 |
| $\nu_1$ | 55.6 |
| $\nu_2$ | 45.9 |
| $\nu_3$ | 40.9 |

TABLE 17. (Lens design 17.)

| | |
|---|---|
| $R_1$ | .390f |
| $-R_2$ | .422f |
| $R_3$ | 3.498f |
| $-R_4$ | .374f |
| $t_1$ | .054f |
| $t_2$ | .049f |
| $t_3$ | .009f |
| $S_1$ | .065f |
| $n_{D1}$ | 1.678 |
| $n_{D2}$ | 1.561 |
| $n_{D3}$ | 1.589 |
| $\nu_1$ | 55.3 |
| $\nu_2$ | 45.2 |
| $\nu_3$ | 40.9 |

TABLE 18. (Lens design 18.)

| | |
|---|---|
| $R_1$ | .385f |
| $-R_2$ | .456f |
| $R_3$ | 1.953f |
| $-R_4$ | .388f |
| $t_1$ | .054f |
| $t_2$ | .050f |
| $t_3$ | .009f |
| $S_1$ | 0.39f |
| $n_{D1}$ | 1.697 |
| $n_{D2}$ | 1.548 |
| $n_{D3}$ | 1.603 |
| $\nu_1$ | 55.6 |
| $\nu_2$ | 45.7 |
| $\nu_3$ | 42.3 |

TABLE 19. (Lens design 19.)

| | |
|---|---|
| $R_1$ | .381f |
| $-R_2$ | .419f |
| $R_3$ | 2.223f |
| $-R_4$ | .386f |
| $t_1$ | .054f |
| $t_2$ | .050f |
| $t_3$ | .009f |
| $S_1$ | 0.38f |
| $n_{D1}$ | 1.691 |
| $n_{D2}$ | 1.561 |
| $n_{D3}$ | 1.603 |
| $\nu_1$ | 54.8 |
| $\nu_2$ | 45.2 |
| $\nu_3$ | 42.3 |

TABLE 20. (Lens design 20.)

| | |
|---|---|
| $R_1$ | .378f |
| $-R_2$ | .476f |
| $R_3$ | 1.555f |
| $-R_4$ | .387f |
| $t_1$ | .054f |
| $t_2$ | .050f |
| $t_3$ | .009f |
| $S_1$ | .025f |
| $n_{D1}$ | 1.691 |
| $n_{D2}$ | 1.532 |
| $n_{D3}$ | 1.578 |
| $\nu_1$ | 54.8 |
| $\nu_2$ | 45.9 |
| $\nu_3$ | 41.5 |

TABLE 21. (Lens design 21.)

| | |
|---|---|
| $R_1$ | .390f |
| $-R_2$ | .433f |
| $R_3$ | 2.219f |
| $-R_4$ | .383f |
| $t_1$ | .054f |
| $t_2$ | .050f |
| $t_3$ | .009f |
| $S_1$ | .045f |
| $n_{D1}$ | 1.691 |
| $n_{D2}$ | 1.561 |
| $n_{D3}$ | 1.578 |
| $\nu_1$ | 54.8 |
| $\nu_2$ | 45.2 |
| $\nu_3$ | 41.5 |

TABLE 22. (Lens design 22.)

| | |
|---|---|
| $R_1$ | .391f |
| $-R_2$ | .436f |
| $R_3$ | 2.460f |
| $-R_4$ | .382f |
| $t_1$ | .054f |
| $t_2$ | .050f |
| $t_3$ | .009f |
| $S_1$ | .052f |
| $n_{D1}$ | 1.691 |
| $n_{D2}$ | 1.561 |
| $n_{D3}$ | 1.589 |
| $\nu_1$ | 54.8 |
| $\nu_2$ | 45.2 |
| $\nu_3$ | 40.9 |

TABLE 23. (Lens design 23.)

| | |
|---|---|
| $R_1$ | .400f |
| $-R_2$ | .454f |
| $R_3$ | 2.431f |
| $-R_4$ | .383f |
| $t_1$ | .054f |
| $t_2$ | .050f |
| $t_3$ | .009f |
| $S_1$ | .058f |
| $n_{D1}$ | 1.697 |
| $n_{D2}$ | 1.561 |
| $n_{D3}$ | 1.578 |
| $\nu_1$ | 55.6 |
| $\nu_2$ | 45.2 |
| $\nu_3$ | 41.5 |

TABLE 24. (Lens design 24.)

| | |
|---|---|
| $R_1$ | .365f |
| $-R_2$ | .454f |
| $R_3$ | 1.473f |
| $-R_4$ | .386f |
| $t_1$ | .054f |
| $t_2$ | .050f |
| $t_3$ | .009f |
| $S_1$ | .018f |
| $n_{D1}$ | 1.691 |
| $n_{D2}$ | 1.532 |
| $n_{D3}$ | 1.603 |
| $\nu_1$ | 54.8 |
| $\nu_2$ | 45.9 |
| $\nu_3$ | 42.3 |

TABLE 25. (Lens design 25.)

| | |
|---|---|
| $R_1$ | .381f |
| $-R_2$ | .464f |
| $R_3$ | 1.728f |
| $-R_4$ | .382f |
| $t_1$ | .054f |
| $t_2$ | .050f |
| $t_3$ | .009f |
| $S_1$ | .035f |
| $n_{D1}$ | 1.691 |
| $n_{D2}$ | 1.532 |
| $n_{D3}$ | 1.589 |
| $\nu_1$ | 54.8 |
| $\nu_2$ | 45.9 |
| $\nu_3$ | 40.9 |

TABLE 26. (Lens design 26.)

| | |
|---|---|
| $R_1$ | .395f |
| $-R_2$ | .450f |
| $R_3$ | 2.578f |
| $-R_4$ | .375f |
| $t_1$ | .054f |
| $t_2$ | .049f |
| $t_3$ | .009f |
| $S_1$ | .066f |
| $n_{D1}$ | 1.697 |
| $n_{D2}$ | 1.561 |
| $n_{D3}$ | 1.589 |
| $\nu_1$ | 55.6 |
| $\nu_2$ | 45.2 |
| $\nu_3$ | 40.9 |

I claim:

1. A symmetrical lens having a second half identical to its first half and being described by the radii R, thicknesses $t$, spaces S and glass types, refractive indices $n_D$ and dispersions $\nu$ subnumerated for the first half in increasing order from the outside toward the surface said radii being taken as positive if bent toward the center of said lens, and said radii, thicknesses and spaces being expressed as a ratio of the focal length $f$ and comprising:

an outer doublet having an outer biconvex lens defined by the values $R_1$, $-R_2$, $t_1$, $n_{D1}$ and $\nu_1$ in surface contact with a biconcave lens defined by the values $-R_2$, $R_3$, $t_2$, $n_{D2}$ and $\nu_2$; and an inner singlet lens half of which has a concave surface toward said outer doublet, which is separated from each doublet by a space S, and which is defined by the values $-R_4$, $t_3$, $n_{D3}$ and $\nu_3$, said values falling within the ranges given in the table below:

| | | | | |
|---|---|---|---|---|
| .365f | < | $R_1$ | < | .400f |
| .408f | < | $-R_2$ | < | .477f |
| 1.473f | < | $R_3$ | < | 3.498f |
| .372f | < | $-R_4$ | < | .399f |
| .053f | < | $t_1$ | < | .055f |
| .049f | < | $t_2$ | < | .051f |
| .0085f | < | $t_3$ | < | .0095f |
| .018f | < | S | < | .066f |
| 1.678 | < | $n_{D1}$ | < | 1.697 |
| 1.532 | < | $n_{D2}$ | < | 1.561 |
| 1.578 | < | $n_{D3}$ | < | 1.603 |
| 54.8 | < | $\nu_1$ | < | 55.6 |
| 45.2 | < | $\nu_2$ | < | 45.9 |
| 40.9 | < | $\nu_3$ | < | 42.3 |

2. The lens of claim 1 having values substantially as listed below:

| | |
|---|---|
| $R_1$ | .382f |
| $-R_2$ | .450f |
| $R_3$ | 2.025f |
| $-R_4$ | .381f |
| $t_1$ | .054f |
| $t_2$ | .050f |
| $t_3$ | .009f |
| $S_1$ | .038f |
| $n_{D1}$ | 1.678 |
| $n_{D2}$ | 1.532 |
| $n_{D3}$ | 1.578 |
| $\nu_1$ | 55.3 |
| $\nu_2$ | 45.9 |
| $\nu_3$ | 41.5 |

3. The lens of claim 1 having values substantially as listed below:

| | |
|---|---|
| $R_1$ | .384f |
| $-R_2$ | .424f |
| $R_3$ | 2.323f |
| $-R_4$ | .372f |
| $t_1$ | .054f |
| $t_2$ | .050f |
| $t_3$ | .009f |
| $S_1$ | .054f |
| $n_{D1}$ | 1.697 |
| $n_{D2}$ | 1.561 |
| $n_{D3}$ | 1.603 |
| $\nu_1$ | 55.6 |
| $\nu_2$ | 45.2 |
| $\nu_3$ | 42.3 |

4. The lens of claim 1 having values substantially as listed below:

| | |
|---|---|
| $R_1$ | .386f |
| $-R_2$ | .434f |
| $R_3$ | 2.400f |
| $-R_4$ | .382f |
| $t_1$ | .054f |
| $t_2$ | .050f |
| $t_3$ | .009f |
| $S_1$ | .044f |
| $n_{D1}$ | 1.678 |
| $n_{D2}$ | 1.548 |
| $n_{D3}$ | 1.578 |
| $\nu_1$ | 55.3 |
| $\nu_2$ | 45.7 |
| $\nu_3$ | 41.5 |

5. The lens of claim 1 having values substantially as listed below:

| | |
|---|---|
| $R_1$ | .373f |
| $-R_2$ | .434f |
| $R_3$ | 1.782f |
| $-R_4$ | .386f |
| $t_1$ | .054f |
| $t_2$ | .050f |
| $t_3$ | .009f |
| $S_1$ | .028f |
| $n_{D1}$ | 1.691 |
| $n_{D2}$ | 1.548 |
| $n_{D3}$ | 1.603 |
| $\nu_1$ | 54.8 |
| $\nu_2$ | 45.7 |
| $\nu_3$ | 42.3 |

6. The lens of claim 1 having values substantially as listed below:

| | |
|---|---|
| $R_1$ | .383f |
| $-R_2$ | .453f |
| $R_3$ | 2.229f |
| $-R_4$ | .039f |
| $t_2$ | .050f |
| $t_3$ | .009f |
| $S_1$ | .046f |
| $n_{D1}$ | 1.678 |
| $n_{D2}$ | 1.532 |
| $n_{D3}$ | 1.589 |
| $\nu_1$ | 55.3 |
| $\nu_2$ | 45.9 |
| $\nu_3$ | 40.9 |

7. The lens of claim 1 having values substantially as listed below:

| | |
|---|---|
| $R_1$ | .373f |
| $-R_2$ | .436f |
| $R_3$ | 1.964f |
| $-R_4$ | .384f |

| | |
|---|---|
| $t_1$ | .054f |
| $t_2$ | .050f |
| $t_3$ | .009f |
| $S_1$ | .031f |
| $n_{D1}$ | 1.678 |
| $n_{D2}$ | 1.532 |
| $n_{D3}$ | 1.603 |
| $\nu_1$ | 55.3 |
| $\nu_2$ | 45.9 |
| $\nu_3$ | 42.3 |

8. The lens of claim 1 having values substantially as listed below:

| | |
|---|---|
| $R_1$ | .392f |
| $-R_2$ | .460f |
| $R_3$ | 1.964f |
| $-R_4$ | .379f |
| $t_1$ | .054f |
| $t_2$ | .050f |
| $t_3$ | .009f |
| $S_1$ | .048f |
| $n_{D1}$ | 1.697 |
| $n_{D2}$ | 1.548 |
| $n_{D3}$ | 1.578 |
| $\nu_1$ | 55.6 |
| $\nu_2$ | 45.7 |
| $\nu_3$ | 41.5 |

9. The lens of claim 1 having values substantially as listed below:

| | |
|---|---|
| $R_1$ | .383f |
| $-R_2$ | .441f |
| $R_3$ | 1.845f |
| $-R_4$ | .381f |
| $t_1$ | .054f |
| $t_2$ | .050f |
| $t_3$ | .009f |
| $S_1$ | .035f |
| $n_{D1}$ | 1.691 |
| $n_{D2}$ | 1.548 |
| $n_{D3}$ | 1.578 |
| $\nu_1$ | 54.8 |
| $\nu_2$ | 45.7 |
| $\nu_3$ | 41.5 |

10. The lens of claim 1 having values substantially as listed below:

| | |
|---|---|
| $R_1$ | .381f |
| $-R_2$ | .449f |
| $R_3$ | 2.389f |
| $-R_4$ | .399f |
| $t_1$ | .054f |
| $t_2$ | .050f |
| $t_3$ | .009f |
| $S_1$ | .033f |
| $n_{D1}$ | 1.678 |
| $n_{D2}$ | 1.548 |
| $n_{D3}$ | 1.603 |
| $\nu_1$ | 55.3 |
| $\nu_2$ | 45.7 |
| $\nu_3$ | 42.3 |

11. The lens of claim 1 having values substantially as listed below:

| | |
|---|---|
| $R_1$ | .388f |
| $-R_2$ | .477f |
| $R_3$ | 1.684f |
| $-R_4$ | .380f |
| $t_1$ | .054f |
| $t_2$ | .050f |
| $t_3$ | .009f |
| $S_1$ | .040f |
| $n_{D1}$ | 1.697 |
| $n_{D2}$ | 1.532 |
| $n_{D3}$ | 1.578 |
| $\nu_1$ | 55.6 |
| $\nu_2$ | 45.9 |
| $\nu_3$ | 41.5 |

12. The lens of claim 1 having values substantially as listed below:

| | |
|---|---|
| $R_1$ | .383f |
| $-R_2$ | .408f |
| $R_3$ | 3.135f |
| $-R_4$ | .381f |
| $t_1$ | .054f |
| $t_2$ | .050f |
| $t_3$ | .009f |
| $S_1$ | .051f |
| $n_{D1}$ | 1.678 |
| $n_{D2}$ | 1.561 |
| $n_{D3}$ | 1.603 |
| $\nu_1$ | 55.3 |
| $\nu_2$ | 45.2 |
| $\nu_3$ | 42.3 |

13. The lens of claim 1 having values substantially as listed below:

| | |
|---|---|
| $R_1$ | .393f |
| $-R_2$ | .461f |
| $R_3$ | 2.162f |
| $-R_4$ | .378f |
| $t_1$ | .054f |
| $t_2$ | .050f |
| $t_3$ | .009f |
| $S_1$ | .055f |
| $n_{D1}$ | 1.697 |
| $n_{D2}$ | 1.548 |
| $n_{D3}$ | 1.589 |
| $\nu_1$ | 55.6 |
| $\nu_2$ | 45.7 |
| $\nu_3$ | 40.9 |

14. The lens of claim 1 having values substantially as listed below:

| | |
|---|---|
| $R_1$ | .387f |
| $-R_2$ | .433f |
| $R_3$ | 2.772f |
| $-R_4$ | .377f |
| $t_1$ | .054f |
| $t_2$ | .050f |
| $t_3$ | .009f |
| $S_1$ | .055f |
| $n_{D1}$ | 1.678 |
| $n_{D2}$ | 1.548 |
| $n_{D3}$ | 1.589 |
| $\nu_1$ | 55.3 |
| $\nu_2$ | 45.7 |
| $\nu_3$ | 40.9 |

15. The lens of claim 1 having values substantially as listed below:

| | |
|---|---|
| $R_1$ | .378f |
| $-R_2$ | .471f |
| $R_3$ | 1.641f |
| $-R_4$ | .385f |
| $t_1$ | .054f |
| $t_2$ | .050f |
| $t_3$ | .009f |
| $S_1$ | .031f |
| $n_{D1}$ | 1.697 |
| $n_{D2}$ | 1.532 |
| $n_{D3}$ | 1.603 |
| $\nu_1$ | 55.6 |
| $\nu_2$ | 45.9 |
| $\nu_3$ | 42.3 |

16. The lens of claim 1 having values substantially as listed below:

| | |
|---|---|
| $R_1$ | .391f |
| $-R_2$ | .417f |
| $R_3$ | 3.131f |
| $-R_4$ | .376f |
| $t_1$ | .054f |
| $t_2$ | .050f |
| $t_3$ | .009f |
| $S_1$ | .059f |
| $n_{D1}$ | 1.678 |
| $n_{D2}$ | 1.561 |
| $n_{D3}$ | 1.578 |
| $\nu_1$ | 55.3 |
| $\nu_2$ | 45.2 |
| $\nu_3$ | 41.5 |

17. The lens of claim 1 having values substantially as listed below:

| | |
|---|---|
| $R_1$ | .390f |
| $-R_2$ | 4.77f |
| $R_3$ | 1.859f |
| $-R_4$ | .379f |
| $t_1$ | .054f |
| $t_2$ | .050f |
| $t_3$ | .009f |
| $S_1$ | .048f |
| $n_{D1}$ | 1.697 |
| $n_{D2}$ | 1.532 |
| $n_{D3}$ | 1.589 |
| $\nu_1$ | 55.6 |
| $\nu_2$ | 45.9 |
| $\nu_3$ | 40.9 |

18. The lens of claim 1 having values substantially as listed below:

| | |
|---|---|
| $R_1$ | .390f |
| $-R_2$ | .422f |
| $R_3$ | 3.498f |
| $-R_4$ | .374f |
| $t_1$ | .054f |
| $t_2$ | .049f |
| $t_3$ | .009f |
| $S_1$ | .065f |
| $n_{D1}$ | 1.678 |
| $n_{D2}$ | 1.561 |
| $n_{D3}$ | 1.589 |
| $\nu_1$ | 55.3 |
| $\nu_2$ | 45.2 |
| $\nu_3$ | 40.9 |

19. The lens of claim 1 having values substantially as listed below:

| | |
|---|---|
| $R_1$ | .385f |
| $-R_2$ | .456f |
| $R_3$ | 1.953f |
| $-R_4$ | .388f |
| $t_1$ | .054f |
| $t_2$ | .050f |
| $t_3$ | .009f |
| $S_1$ | .039f |
| $n_{D1}$ | 1.697 |
| $n_{D2}$ | 1.548 |
| $n_{D3}$ | 1.603 |
| $\nu_1$ | 55.6 |
| $\nu_2$ | 45.7 |
| $\nu_3$ | 42.3 |

20. The lens of claim 1 having values substantially as listed below:

| | |
|---|---|
| $R_1$ | .381f |
| $-R_2$ | .419f |
| $R_3$ | 2.223f |
| $-R_4$ | .386f |
| $t_1$ | .054f |
| $t_2$ | .050f |
| $t_3$ | .009f |
| $S_1$ | .038f |
| $n_{D1}$ | 1.691 |
| $n_{D2}$ | 1.561 |
| $n_{D3}$ | 1.603 |
| $\nu_1$ | 54.8 |
| $\nu_2$ | 45.2 |
| $\nu_3$ | 42.3 |

21. The lens of claim 1 having values substantially as listed below.

| | |
|---|---|
| $R_1$ | .378f |
| $-R_2$ | .476f |
| $R_3$ | 1.555f |
| $-R_4$ | .387f |
| $t_1$ | .054f |
| $t_2$ | .050f |
| $t_3$ | .009f |
| $S_1$ | .025f |
| $n_{D1}$ | 1.691 |
| $n_{D2}$ | 1.532 |
| $n_{D3}$ | 1.578 |
| $\nu_1$ | 54.8 |
| $\nu_2$ | 45.9 |
| $\nu_3$ | 41.5 |

22. The lens of claim 1 having values substantially as listed below:

| | |
|---|---|
| $R_1$ | .390f |
| $-R_2$ | .433f |
| $R_3$ | 2.219f |
| $-R_4$ | .383f |
| $t_1$ | .054f |
| $t_2$ | .050f |
| $t_3$ | .009f |
| $S_1$ | .045f |
| $n_{D1}$ | 1.691 |
| $n_{D2}$ | 1.561 |
| $n_{D3}$ | 1.578 |
| $\nu_1$ | 54.8 |
| $\nu_2$ | 45.2 |
| $\nu_3$ | 41.5 |

23. The lens of claim 1 having values substantially as listed below:

| | |
|---|---|
| $R_1$ | .391f |
| $-R_2$ | .436f |
| $R_3$ | 2.460f |
| $-R_4$ | .382f |
| $t_1$ | .054f |
| $t_2$ | .050f |
| $t_3$ | .009f |
| $S_1$ | .052f |
| $n_{D1}$ | 1.691 |
| $n_{D2}$ | 1.561 |
| $n_{D3}$ | 1.589 |
| $\nu_1$ | 54.8 |
| $\nu_2$ | 45.2 |
| $\nu_3$ | 40.9 |

24. The lens of claim 1 having values substantially as listed below:

| | |
|---|---|
| $R_1$ | .400f |
| $-R_2$ | .454f |
| $R_3$ | 2.431f |
| $-R_4$ | .383f |
| $t_1$ | .054f |
| $t_2$ | .050f |
| $t_3$ | .009f |
| $S_1$ | .058f |
| $n_{D1}$ | 1.697 |
| $n_{D2}$ | 1.561 |
| $n_{D3}$ | 1.578 |
| $\nu_1$ | 55.6 |
| $\nu_2$ | 45.2 |
| $\nu_3$ | 41.5 |

25. The lens of claim 1 having values substantially as listed below:

| | |
|---|---|
| $R_1$ | .365f |
| $-R_2$ | .454f |
| $R_3$ | 1.473f |
| $-R_4$ | .386f |
| $t_1$ | .054f |
| $t_2$ | .050f |
| $t_3$ | .009f |
| $S_1$ | .018f |
| $n_{D1}$ | 1.691 |
| $n_{D2}$ | 1.532 |
| $n_{D3}$ | 1.603 |
| $\nu_1$ | 54.8 |
| $\nu_2$ | 45.9 |
| $\nu_3$ | 42.3 |

26. The lens of claim 1 having values substantially as listed below:

| | |
|---|---|
| $R_1$ | .381f |
| $-R_2$ | .464f |
| $R_3$ | 1.728f |
| $-R_4$ | .382f |
| $t_1$ | .054f |
| $t_2$ | .050f |
| $t_3$ | .009f |

| | |
|---|---|
| $S_1$ | .035f |
| $n_{D1}$ | 1.691 |
| $n_{D2}$ | 1.532 |
| $n_{D3}$ | 1.589 |
| $\nu_1$ | 54.8 |
| $\nu_2$ | 45.9 |
| $\nu_3$ | 40.9 |

27. The lens of claim 1 having values substantially as listed below:

| | |
|---|---|
| $R_1$ | .395f |
| $-R_2$ | .450f |
| $R_3$ | 2.578f |
| $-R_4$ | .375f |
| $t_1$ | .054f |
| $t_2$ | .049f |
| $t_3$ | .009f |
| $S_1$ | .066f |
| $n_{D1}$ | 1.697 |
| $n_{D2}$ | 1.561 |
| $n_{D3}$ | 1.589 |
| $\nu_1$ | 55.6 |
| $\nu_2$ | 45.2 |
| $\nu_3$ | 40.0 |

28. A retroreflective lens having a front doublet comprising:
an outer biconvex lens having radii $R_1$ and $-R_2$, thickness $t_1$, refractive index $n_{D1}$ and dispersion $\nu_1$, and lying in surface contact with an inner biconcave lens having radii $-R_2$ and $R_3$, thickness $t_2$, refractive index $n_{D2}$ and dispersion $\nu_2$; and
a plano-concave lens airspaced from said biconcave lens of said doublet by a space $S_1$, having its concave surface facing said doublet, its plano surface being reflective, and having a concave radius $-R_4$, thickness $t_3$, refractive index $n_{D3}$ and dispersion $\nu_3$ said radii, thickness and space being expressed in the table below in ratio to the focal length f of said lens, and radii being taken as negative if centered on the front side, and all of said values lying within the ranges given in the table below:

| | | | | |
|---|---|---|---|---|
| .365f | < | $R_1$ | < | .400f |
| .408f | < | $-R_2$ | < | .477f |
| 1.473f | < | $R_3$ | < | 3.498f |
| .372f | < | $-R_4$ | < | .399f |
| .053f | < | $t_1$ | < | .055f |
| .049f | < | $t_2$ | < | .051f |
| .0085f | < | $t_3$ | < | .0095f |
| .018f | < | $S$ | < | .066f |
| 1.678 | < | $n_{D1}$ | < | 1.697 |
| 1.532 | < | $n_{D2}$ | < | 1.561 |
| 1.578 | < | $n_{D3}$ | < | 1.603 |
| 54.8 | < | $\nu_1$ | < | 55.6 |
| 45.2 | < | $\nu_2$ | < | 45.9 |
| 40.9 | < | $\nu_3$ | < | 42.3 |

29. The lens of claim 28 having values substantially as listed below:

| | |
|---|---|
| $R_1$ | .382f |
| $-R_2$ | .450f |
| $R_3$ | 2.025f |
| $-R_4$ | .381f |
| $t_1$ | .054f |
| $t_2$ | .050f |
| $t_3$ | .009f |
| $S_1$ | .038f |
| $n_{D1}$ | 1.678 |
| $n_{D2}$ | 1.532 |
| $n_{D3}$ | 1.578 |
| $\nu_1$ | 55.3 |
| $\nu_2$ | 45.9 |
| $\nu_3$ | 41.5 |

30. The lens of claim 28 having values substantially as listed below:

| | |
|---|---|
| $R_1$ | .384f |
| $-R_2$ | .424f |
| $R_3$ | 2.323f |
| $-R_4$ | .372f |
| $t_1$ | .054f |
| $t_2$ | .050f |
| $t_3$ | .009f |
| $S_1$ | .054f |
| $n_{D1}$ | 1.697 |
| $n_{D2}$ | 1.561 |
| $n_{D3}$ | 1.603 |
| $\nu_1$ | 55.6 |
| $\nu_2$ | 45.2 |
| $\nu_3$ | 42.3 |

31. The lens of claim 28 having values substantially as listed below:

| | |
|---|---|
| $R_1$ | .386f |
| $-R_2$ | .434f |
| $R_3$ | 2.400f |
| $-R_4$ | .382f |
| $t_1$ | .054f |
| $t_2$ | .050f |
| $t_3$ | .009f |
| $S_1$ | .044f |
| $n_{D1}$ | 1.678 |
| $n_{D2}$ | 1.548 |
| $n_{D3}$ | 1.578 |
| $\nu_1$ | 55.3 |
| $\nu_2$ | 45.7 |
| $\nu_3$ | 41.5 |

32. The lens of claim 28 having values substantially as listed below:

| | |
|---|---|
| $R_1$ | .373f |
| $-R_2$ | .434f |
| $R_3$ | 1.782f |
| $-R_4$ | .386f |
| $t_1$ | .054f |
| $t_2$ | .050f |
| $t_3$ | .009f |
| $S_1$ | .028f |
| $n_{D1}$ | 1.691 |
| $n_{D2}$ | 1.548 |
| $n_{D3}$ | 1.603 |
| $\nu_1$ | 54.8 |
| $\nu_2$ | 45.7 |
| $\nu_3$ | 42.3 |

33. The lens of claim 28 having values substantially as listed below:

| | |
|---|---|
| $R_1$ | .383f |
| $-R_2$ | .453f |
| $R_3$ | 2.229f |
| $-R_4$ | .379f |
| $t_1$ | .054f |
| $t_2$ | .050f |
| $t_3$ | .009f |
| $S_1$ | .046f |
| $n_{D1}$ | 1.678 |
| $n_{D2}$ | 1.532 |
| $n_{D3}$ | 1.589 |
| $\nu_1$ | 55.3 |
| $\nu_2$ | 45.9 |
| $\nu_3$ | 40.9 |

34. The lens of claim 28 having values substantially as listed below:

| | |
|---|---|
| $R_1$ | .373f |
| $-R_2$ | .436f |
| $R_3$ | 1.964f |
| $-R_4$ | .384f |
| $t_1$ | .054f |
| $t_2$ | .050f |
| $t_3$ | .009f |
| $S_1$ | .031f |
| $n_{D1}$ | 1.678 |
| $n_{D2}$ | 1.532 |
| $n_{D3}$ | 1.603 |
| $\nu_1$ | 55.3 |
| $\nu_2$ | 45.9 |
| $\nu_3$ | 42.3 |

35. The lens of claim 28 having values substantially as listed below:

| | |
|---|---|
| $R_1$ | .392f |
| $-R_2$ | .460f |
| $R_3$ | 1.964f |
| $-R_4$ | .379f |
| $t_1$ | .054f |
| $t_2$ | .050f |
| $t_3$ | .009f |
| $S_1$ | .048f |
| $n_{D1}$ | 1.697 |
| $n_{D2}$ | 1.548 |
| $n_{D3}$ | 1.578 |
| $\nu_1$ | 55.6 |
| $\nu_2$ | 45.7 |
| $\nu_3$ | 41.5 |

36. The lens of claim 28 having values substantially as listed below:

| | |
|---|---|
| $R_1$ | .383f |
| $-R_2$ | .441f |
| $R_3$ | 1.845f |
| $-R_4$ | .381f |
| $t_1$ | .054f |
| $t_2$ | .050f |
| $t_3$ | .009f |
| $S_1$ | .035f |
| $n_{D1}$ | 1.691 |
| $n_{D2}$ | 1.548 |
| $n_{D3}$ | 1.578 |
| $\nu_1$ | 54.8 |
| $\nu_2$ | 45.7 |
| $\nu_3$ | 41.5 |

37. The lens of claim 28 having values substantially as listed below:

| | |
|---|---|
| $R_1$ | .381f |
| $-R_2$ | .449f |
| $R_3$ | 2.389f |
| $-R_4$ | .399f |
| $t_1$ | .054f |
| $t_2$ | .050f |
| $t_3$ | .009f |
| $S_1$ | .033f |
| $n_{D1}$ | 1.678 |
| $n_{D2}$ | 1.548 |
| $n_{D3}$ | 1.603 |
| $\nu_1$ | 55.3 |
| $\nu_2$ | 45.7 |
| $\nu_3$ | 42.3 |

38. The lens of claim 28 having values substantially as listed below:

| | |
|---|---|
| $R_1$ | .388f |
| $-R_2$ | .477f |
| $R_3$ | 1.684f |
| $-R_4$ | .380f |
| $t_1$ | .054f |
| $t_2$ | .050f |
| $t_3$ | .009f |
| $S_1$ | .040f |
| $n_{D1}$ | 1.697 |
| $n_{D2}$ | 1.532 |
| $n_{D3}$ | 1.578 |
| $\nu_1$ | 55.6 |
| $\nu_2$ | 45.9 |
| $\nu_3$ | 41.5 |

39. The lens of claim 28 having values substantially as listed below:

| | |
|---|---|
| $R_1$ | .383f |
| $-R_2$ | .408f |
| $R_3$ | 3.135f |
| $-R_4$ | .381f |
| $t_1$ | .054f |
| $t_2$ | .050f |
| $t_3$ | .009f |
| $S_1$ | .051f |
| $n_{D1}$ | 1.678 |
| $n_{D2}$ | 1.561 |
| $n_{D3}$ | 1.603 |
| $\nu_1$ | 55.3 |
| $\nu_2$ | 45.2 |
| $\nu_3$ | 42.3 |

40. The lens of claim 28 having values substantially as listed below:

| | |
|---|---|
| $R_1$ | .393f |
| $-R_2$ | .461f |
| $R_3$ | 2.162f |
| $-R_4$ | .378f |
| $t_1$ | .054f |
| $t_2$ | .050f |
| $t_3$ | .009f |
| $S_1$ | .055f |
| $n_{D1}$ | 1.697 |
| $n_{D2}$ | 1.548 |
| $n_{D3}$ | 1.589 |
| $\nu_1$ | 55.6 |
| $\nu_2$ | 45.7 |
| $\nu_3$ | 40.9 |

41. The lens of claim 28 having values substantially as listed below:

| | |
|---|---|
| $R_1$ | .387f |
| $-R_2$ | .433f |
| $R_3$ | 2.772f |
| $-R_4$ | .377f |
| $t_1$ | .054f |
| $t_2$ | .050f |
| $t_3$ | .009f |
| $S_1$ | .055f |
| $n_{D1}$ | 1.678 |
| $n_{D2}$ | 1.548 |
| $n_{D3}$ | 1.589 |
| $\nu_1$ | 55.3 |
| $\nu_2$ | 45.7 |
| $\nu_3$ | 40.9 |

42. The lens of claim 28 having values substantially as listed below:

| | |
|---|---|
| $R_1$ | .378f |
| $-R_2$ | .471f |
| $R_3$ | 1.641f |
| $-R_4$ | .385f |
| $t_1$ | .054f |
| $t_2$ | .050f |
| $t_3$ | .009f |
| $S_1$ | .031f |
| $n_{D1}$ | 1.697 |
| $n_{D2}$ | 1.532 |
| $n_{D3}$ | 1.603 |
| $\nu_1$ | 55.6 |
| $\nu_2$ | 45.9 |
| $\nu_3$ | 42.3 |

43. The lens of claim 28 having values substantially as listed below:

| | |
|---|---|
| $R_1$ | .391f |
| $-R_2$ | .417f |
| $R_3$ | 3.131f |
| $-R_4$ | .376f |
| $t_1$ | .054f |
| $t_2$ | .050f |
| $t_3$ | .009f |
| $S_1$ | .059f |
| $n_{D1}$ | 1.678 |
| $n_{D2}$ | 1.561 |
| $n_{D3}$ | 1.578 |
| $\nu_1$ | 55.3 |
| $\nu_2$ | 45.2 |
| $\nu_3$ | 41.5 |

44. The lens of claim 28 having values substantially as listed below:

| | |
|---|---|
| $R_1$ | .390f |
| $-R_2$ | .477f |
| $R_3$ | 1.859f |
| $-R_4$ | .379f |
| $t_1$ | .054f |
| $t_2$ | .050f |

| | |
|---|---|
| $t_3$ | −.009$f$ |
| $S_1$ | .048$f$ |
| $n_{D1}$ | 1.697 |
| $n_{D2}$ | 1.532 |
| $n_{D3}$ | 1.589 |
| $\nu_1$ | 55.6 |
| $\nu_2$ | 45.9 |
| $\nu_3$ | 40.9 |

45. The lens of claim 28 having values substantially as listed below:

| | |
|---|---|
| $R_1$ | .390$f$ |
| $-R_2$ | .422$f$ |
| $R_3$ | 3.498$f$ |
| $-R_4$ | .374$f$ |
| $t_1$ | .054$f$ |
| $t_2$ | .049$f$ |
| $t_3$ | .009$f$ |
| $S_1$ | .065$f$ |
| $n_{D1}$ | 1.678 |
| $n_{D2}$ | 1.561 |
| $n_{D3}$ | 1.589 |
| $\nu_1$ | 55.3 |
| $\nu_2$ | 45.2 |
| $\nu_3$ | 40.9 |

46. The lens of claim 28 having values substantially as listed below:

| | |
|---|---|
| $R_1$ | .385$f$ |
| $-R_2$ | .456$f$ |
| $R_3$ | 1.953$f$ |
| $-R_4$ | .388$f$ |
| $t_1$ | .054$f$ |
| $t_2$ | .050$f$ |
| $t_3$ | .009$f$ |
| $S_1$ | .039$f$ |
| $n_{D1}$ | 1.697 |
| $n_{D2}$ | 1.548 |
| $n_{D3}$ | 1.603 |
| $\nu_1$ | 55.6 |
| $\nu_2$ | 45.7 |
| $\nu_3$ | 42.3 |

47. The lens of claim 28 having values substantially as listed below:

| | |
|---|---|
| $R_1$ | .381$f$ |
| $-R_2$ | .419$f$ |
| $R_3$ | 2.223$f$ |
| $-R_4$ | .386$f$ |
| $t_1$ | .054$f$ |
| $t_2$ | .050$f$ |
| $t_3$ | .009$f$ |
| $S_1$ | .038$f$ |
| $n_{D1}$ | 1.691 |
| $n_{D2}$ | 1.561 |
| $n_{D3}$ | 1.603 |
| $\nu_1$ | 54.8 |
| $\nu_2$ | 45.2 |
| $\nu_3$ | 42.3 |

48. The lens of claim 28 having values substantially as listed below:

| | |
|---|---|
| $R_1$ | .378$f$ |
| $-R_2$ | .476$f$ |
| $R_3$ | 1.555$f$ |
| $-R_4$ | .387$f$ |
| $t_1$ | .054$f$ |
| $t_2$ | .050$f$ |
| $t_3$ | .009$f$ |
| $S_1$ | .025$f$ |
| $n_{D1}$ | 1.691 |
| $n_{D2}$ | 1.532 |
| $n_{D3}$ | 1.578 |
| $\nu_1$ | 54.8 |
| $\nu_2$ | 45.9 |
| $\nu_3$ | 41.5 |

49. The lens of claim 28 having values substantially as listed below:

| | |
|---|---|
| $R_1$ | .390$f$ |
| $-R_2$ | .433$f$ |
| $R_3$ | 2.219$f$ |
| $-R_4$ | .383$f$ |
| $t_1$ | .054$f$ |
| $t_2$ | .050$f$ |
| $t_3$ | .009$f$ |
| $S_1$ | .045$f$ |
| $n_{D1}$ | 1.691 |
| $n_{D2}$ | 1.561 |
| $n_{D3}$ | 1.578 |
| $\nu_1$ | 54.8 |
| $\nu_2$ | 45.2 |
| $\nu_3$ | 41.5 |

50. The lens of claim 28 having values substantially as listed below:

| | |
|---|---|
| $R_1$ | .391$f$ |
| $-R_2$ | .436$f$ |
| $R_3$ | 2.460$f$ |
| $-R_4$ | .382$f$ |
| $t_1$ | .054$f$ |
| $t_2$ | .050$f$ |
| $t_3$ | .009$f$ |
| $S_1$ | .052$f$ |
| $n_{D1}$ | 1.691 |
| $n_{D2}$ | 1.561 |
| $n_{D3}$ | 1.589 |
| $\nu_1$ | 54.8 |
| $\nu_2$ | 45.2 |
| $\nu_3$ | 40.9 |

51. The lens of claim 28 having values substantially as listed below:

| | |
|---|---|
| $R_1$ | .400$f$ |
| $-R_2$ | .454$f$ |
| $R_3$ | 2.431$f$ |
| $-R_4$ | .383$f$ |
| $t_1$ | .054$f$ |
| $t_2$ | .050$f$ |
| $t_3$ | .009$f$ |
| $S_1$ | .058$f$ |
| $n_{D1}$ | 1.697 |
| $n_{D2}$ | 1.561 |
| $n_{D3}$ | 1.578 |
| $\nu_1$ | 55.6 |
| $\nu_2$ | 45.2 |
| $\nu_3$ | 41.5 |

52. The lens of claim 28 having values substantially as listed below:

| | |
|---|---|
| $R_1$ | .365$f$ |
| $-R_2$ | .454$f$ |
| $R_3$ | 1.473$f$ |
| $-R_4$ | .386$f$ |
| $t_1$ | .054$f$ |
| $t_2$ | .050$f$ |
| $t_3$ | .009$f$ |
| $S_1$ | .018$f$ |
| $n_{D1}$ | 1.691 |
| $n_{D2}$ | 1.532 |
| $n_{D3}$ | 1.603 |
| $\nu_1$ | 54.8 |
| $\nu_2$ | 45.9 |
| $\nu_3$ | 42.3 |

53. The lens of claim 28 having values substantially as listed below:

| | |
|---|---|
| $R_1$ | .381$f$ |
| $-R_2$ | .464$f$ |
| $R_3$ | 1.728$f$ |
| $-R_4$ | .382$f$ |
| $t_1$ | .054$f$ |
| $t_2$ | .050$f$ |
| $t_3$ | .009$f$ |
| $S_1$ | .035$f$ |
| $n_{D1}$ | 1.691 |
| $n_{D2}$ | 1.532 |
| $n_{D3}$ | 1.589 |
| $\nu_1$ | 54.8 |
| $\nu_2$ | 45.9 |
| $\nu_3$ | 40.9 |

54. The lens of claim 28 having values substantially as listed below:

| | |
|---|---|
| $R_1$ | .395f |
| $-R_2$ | .450f |
| $R_3$ | 2.578f |
| $-R_4$ | .375f |
| $t_1$ | .054f |
| $t_2$ | .049f |
| $t_3$ | .009f |
| $S_1$ | .066f |
| $n_{D1}$ | 1.697 |
| $n_{D2}$ | 1.561 |
| $n_{D3}$ | 1.589 |
| $\nu_1$ | 55.6 |
| $\nu_2$ | 45.2 |
| $\nu_3$ | 40.9 |

* * * * *